United States Patent [19]

Suzuki et al.

[11] 3,761,772

[45] Sept. 25, 1973

[54] ELECTRICAL CAPACITOR

[75] Inventors: Masaru Suzuki; Katumasa Sagarifuji, both of Otsu; Toshiya Yoshiii, Kyoto; Yasuo Saito, Mikuracho, Kusatsu-shi; Takeo Fusayama; Takeshi Hashimoto, both of Otsu, all of Japan

[73] Assignee: Toray Industries, Inc., Tokyo, Japan

[22] Filed: Jan. 26, 1973

[21] Appl. No.: 327,073

[30] Foreign Application Priority Data

Feb. 15, 1972 Japan..........................47/15208

[52] U.S. Cl.................................. 317/258, 317/260
[51] Int. Cl............................................ H01g 3/175
[58] Field of Search............................ 317/260, 258

[56] References Cited
UNITED STATES PATENTS
3,430,116  2/1969  Johnstone........................... 317/258
FOREIGN PATENTS OR APPLICATIONS
106,535  1/1939  Australia............................ 317/260

Primary Examiner—E. A. Goldberg
Attorney—Austin R. Miller et al.

[57] ABSTRACT

An oil-impregnated electrical capacitor, the dielectric spacer of which comprises a bi-axially oriented polypropylene film having at least one surface laminated with a propylene-ethylene copolymer layer, surface roughened by embossing, having 0.5 – 7.0 wt percent of ethylene units based on the total weight of the copolymer.

4 Claims, 3 Drawing Figures

ELECTRICAL CAPACITOR

BACKGROUND OF THE INVENTION

The present invention relates to electrical capacitors, having as the dielectric spacer a thermoplastic film comprising a bi-axially oriented polypropylene film having at least one surface laminated with a propylene-ethylene copolymer layer having a surface roughened by embossing.

Capacitor dielectric spacers have in the past been made of kraft paper or other cellulosic materials and more recently of synthetic resin films, either alone or in conjunction with kraft paper sheets. Synthetic resin filsm in general are superior to cellulosic sheet dielectrics in that they can withstand higher voltage stresses per unit thickness, are less subject to flaws and defects such as pin holes or conductive particles which reduce electrical strength, and have lower dissipation factor or power loss characteristics. In view of these and other properties, capacitors with synthetic resin film dielectrics can usually be made smaller than paper dielectric capacitors to obtain equivalent capacitance and voltage ratings. However, the non-porous nature of the synthetic resin films makes it difficult to impregnate them adequately. Poor impregnation results in unoccupied pores and voids in the interstices occuring between the films and adjacent non-porous surfaces with resultant deterioration and premature breakdown.

One method which has been proposed to improve impregnation of capacitors containing synthetic resin dielectrics is to use a porous material such as kraft paper in conjunction with the synthetic resin film. In these composite or layered dielectric capacitors, the porous layer, probably due to a wicking action, provides better and more uniform impregnation of the dielectric fluid. However, the use of a paper layer decreases the ability of the dielectric to withstand high voltage stresses per unit of thickness, and decreases dissipitation factor characteristics so that in general the beneficial results are offset to a commercially significant extent.

Now, in accordance with this invention it has been found that improved oil impregnated electrical capacitors having specific solid dielectric material can be produced without the above disadvantages and that the capacitors so produced are capable of withstanding relatively high voltages without suffering dielectric breakdown or corona discharges.

SUMMARY OF THE INVENTION

The present invention relates to electrical capacitors, and more particularly to coil impregnated electrical capacitors consisting of a pair of conductive electrodes separated by a dielectric spacer comprising a bi-axially oriented polypropylene film having at least one surface laminated with a layer of propylene-ethylene copolymer including 0.5 – 7 wt percent of ethylene units based on the total weight of the copolymer and having an embossed surface thereon, and a dielectric oil impregnating the film.

One object of this invention is to provide an improved oil-impregnated capacitor which is capable of withstanding relatively high voltages without suffering dielectric breakdown or corona discharges.

Another object of this invention is to provide a capacitor which can be made smaller than paper dielectric capacitors to obtain equivalent capacitance and voltage ratings.

DETAILED DESCRIPTION OF THE INVENTION

Figure 1:
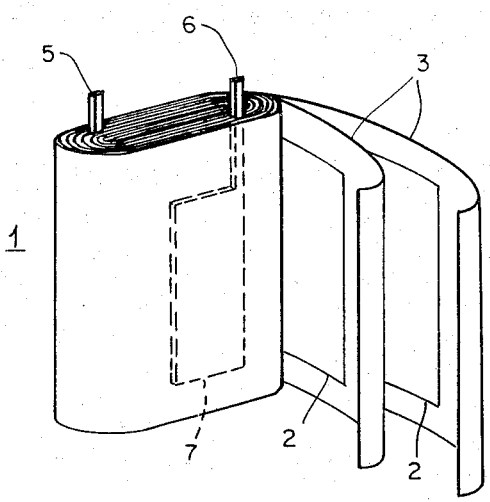

This invention relates to an electric capacitor consisting of a pair of conductive electrodes separated by a dielectric spacer comprising a bi-axially oriented polypropylene film having at least one surface laminated with a layer of propylene-ethylene copolymer having 0.5 – 7.0 wt percent ethylene units based on the total weight of the copolymer and having an embossed surface thereon, and a dielectric oil impregnating the film.

The spacer films of this invention are produced as follows.

I. Forming the Laminate

A. Molten polypropylene is conjugated with molten propylene-ethylene copolymer in an extruding die and co-extruded so as to make the double-layered laminated sheet. The molded laminated sheet is bi-axially oriented simultaneously or successively and heat-set, or B. Molten or solid polypropylene sheet is laminated with molten or solid propylene-ethylene copolymer to make a double-layered sheet. Then this sheet is bi-axially oriented simultaneously or successively and heat-set, or C. Longitudinally oriented polypropylene sheet is laminated with molten or solid propylene-ethylene copolymer to make a double-layered sheet. Then the sheet is oriented transversely and heat-set, or D. Bi-axially oriented polypropylene film is laminated with molten propylene-ethylene copolymer.

II. Embossing

A. These laminated films are then embossed or roughened by an embossing roll, matted roll or paper-patterned roll.

These films can be embossed under relatively low temperature and low pressure. The embossing temperature is preferably from 70° to 160° C, more preferably from 90° to 140° C, and the embossing pressure is preferably from 0.05 kg/cm to 50 kg/cm, more preferably from 0.2 kg/cm to 20 kg/cm.

Under these conditions, the laminated copolymer layer of the film is replicated, and the bi-axially oriented poly-propylene layer is not substantially replicated, so that the spacer film has almost no scratches or pinholes, and has excellent oil-impregnating characteristics.

On the other hand, for single layered bi-axially oriented polypropylene film, the replicated patterns on the surface disappear elastically under relatively low embossing temperature. While under high embossing temperatures to produce sufficient replication of polypropylene, the film is subject to thermal shrinkage, and damage to the flatness and appearance of the film.

As to the roughness of the embossed spacer film surface of this invention, it is preferably from about 3 mesh to 500 mesh, more preferably from about 10 mesh to 200 mesh.

As the surface pattern on the embossing roll, any of various shapes can be used as long as it will provide suitable roughness on the surface of the double layered film. For example, a matter finished roll (sand blasted), or a chemically etched gravure roll with square-shaped, round-shaped or hexagonal-shaped surface projections can be used. It is also possible to roughen the film surface with paper-covered rolls, cloth-covered rolls, cloth-covered endless belts and the like.

While the propylene-ethylene layer in the dielectric spaces in the capacitors of this invention may be nonoriented, uni-axially oriented, or bi-axially oriented, the polypropylene layer must be bi-axially oriented and more specifically, must be oriented at least 1.5x, preferably from 3.0x to 7.0x, its original dimension in the longitudinal direction, and at least 2.0x, preferably from 4.0x to 13.0x in the transverse direction.

The substratum layer of polypropylene may be isotactic polypropylene or propylene copolymer with other olefins which show substantially the same crystalline properties as isotactic polypropylene.

The laminated surface layer is comprised of propylene-ethylene copolymer including ethylene units in the range of from 0.5 to 7.0 weight percent based on the total weight of the copolymer.

If less than 0.5 weight percent ethylene units are included, the laminated film cannot be embossed well and, as a capacitor material, shows poor oil impregnation. As a result, electrical capacitors using such dielectric spacers cannot withstand relatively high voltages without suffering dielectric breakdown or corona discharges.

On the other hand, if more than 7.0 weight percent ethylene units are included, the oil resisting property of the propylene-ethylene copolymer layer is not satisfactory. As a result, electrical capacitors using such dielectric spacers have a short operation life and high dissipation factor characteristics (tan δ) so that in general beneficial results are offset to a commercially significant extent.

Concerning the thickness ratio of the bi-axially oriented polypropylene layer to the laminated propylene-ehtylene co-polymer layer, it is preferable that this ratio be in the range from 1 to 20, more preferably 2 – 10.

The laminated spacer film of this invention may have any desired thickness, but generally the polypropylene layer is 5 – 3$\mu$, preferably 10 – 20$\mu$ thick, and the propylene-ethylene copolymer layer is 0.5 – 10$\mu$, preferably 1 – 5$\mu$ thick.

The electrical capacitors of the present invention are prepared in the usual manner except for the solid dielectric material employed. Usually, they are prepared by winding a strip of metallic foil separated by two strips of the dielectric spacer film of the present invention. The spacer film of the present invention may also be used with metalized electrodes on its surface, rather than sandwiching it between metallic foil strips.

Figure 2:
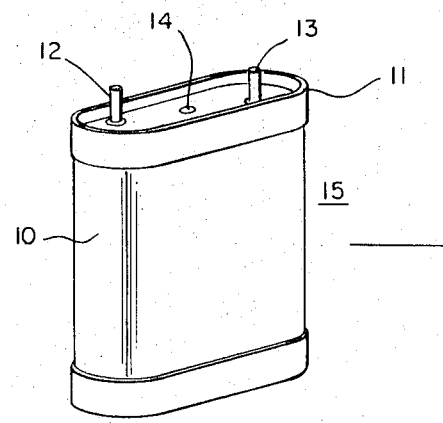
Figure 3:
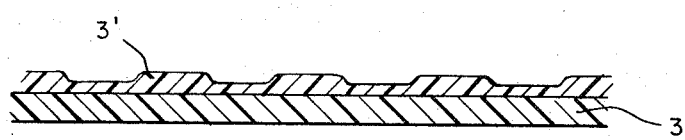

Thus as in shown in the accompanying drawings, FIG. 1 is a perspective view of a partially uncoiled roller capacitor assembly, FIG. 2 is a perspective view of a capacitor of the type of FIG. 1 after being encased in a container, and FIG. 3 is a fragmentary cross-sectional view of the dielectric spacer film of this invention, including a polypropylene layer 3 and an emboseed propylene-ethylene copolymer layer 3'.

With reference to the drawings, the capacitor assembly 1 of FIG. 1 can be made by convolutely windings strips 2 of metal foil such as aluminum, copper, tantalum, etc, with an interleaved dielectric spacer film 3.

Electrical contact with the electrodes can be made by laid-in tap straps 5 and 6 having their ends protruding from one end of the roller capacitor assembly. The tap straps can be welded to the electrodes, if desired, to obtain a better contact, and the lower part of the straps 5 and 6 can be enlarged as at 7 to provide a larger contact area with its cooperating electrode.

Prior to impregnation, the electrode-spacer assembly 1 is usually placed in a container such as the metal container 10 shown in FIG. 2, and the cover 11 hermetically sealed to the container.

Although not illustrated, the unit 15 shown in FIG. 2 further includes a dielectric oil which occupies the remaining space in container 10 not occupied by the capacitor assembly and which also impregnates the dielectric spacer 3.

Before the cover is sealed on the container, the contact tap straps 5 and 6 are respectively affixed to the terminals 12 and 13 extending through and insulated from the cover.

In order to allow withdrawal of moisture and air from the assembly and introduction of the impregnating oil, a small hole 14 is provided in the cover 11.

Before impregnation, capacitor assemblies are normally vacuum dried to remove residual moisture. The drying temperature will vary, of course, depending on the length of the drying cycle. With too low a temperature, the drying period is excessively long, while too high a temperature causes decomposition and shrinkage of the dielectric spacer.

The impregnating dielectric oil is admitted to the capacitor assembly through hole 14 preferably while the dried assembly is still under vacuum in a suitable evacuated enclosure. Usually, sufficient impregnating oil is introduced to at least submerge the capacitor element in the container. The pressure in the enclosure is then raised to atmospheric pressure, and the assembly permitted to stand for a number of hours for thorough penetration of the oil impregnant. After impregnation, the capacitor unit is sealed, as by applying a suitable quantity of solder to hole 14. In addition to the foregoing processes, techniques which generally utilize heat and-/or pressure can be utilized to aid in the impregnatng process.

Certain well-known impregnating dielectric oils can be employed in the present invention. Examples of suitable impregnants are mineral oil, castor oil, cotton seed oil, silicone oil, polybutene and any of the various halogenated hydrocarbon compounds. Examples of the halogenated aromatic compounds are the chlorinated diphenyls, the chlorinated diphenyl ketones, pentachloronitrodiphenyl and its alkyl derivatives, chlorinated benzene and benzene derivatives and the like.

COMPARATIVE EXAMPLES

Several isotactic polypropylene sheet samples were laminated with propylene-ethylene copolymers of differing ethylene unit contents by a melt extrusion process, and then oriented 5x in the longitudinal direction and 8x in the transverse direction. The oriented film structure comprised a polypropylene layer of 15$\mu$ thickness and a propylene-ethylene copolymer layer of 3$\mu$ thickness. The propylene-ethylene copolymer layer's surface was roughened by embossing at 130° C and 2.0 kg/cm with a matted finishing roll of about 80 mesh.

Capacitor elements were prepared in the usual manner, except for the dielectric films employed, by winding a strip of aluminum foil separated by two strips of these sample films, and impregnating with trichlorodiphenyl under vacuum conditions. These capacitors had capacitances of about 0.2$\mu$ F. These capacitors were measured for corona starting voltage, dissipation factor and breakdown life Corona starting voltage herein indicates the voltage at which corona discharge occurred when tested with an increasing voltage at 60 Hz AC.

The dissipation factor (tan δ) was measured at room temperature.

The breakdown life was measured in hours, taken until the capacitors were punctured at 130° C. (It is necessary for a feasible electric capacitor to have a breakdown life of more than 1,000 hours.)

The results are tabulated in Table 1.

TABLE 1

| Sample No. | Surface condition of film | Content of ethylene units in the copolymerized layer, wt. percent | Corona starting voltage (v.) | Dissipation factor, percent | Breakdown life (hr.) |
|---|---|---|---|---|---|
| A | Embossed | 0 | 800 | 0.02 | 1,500 |
| B | Smooth | 0 | 800 | 0.02 | |
| C | Embossed | 0.2 | 1,200 | 0.02 | 1,800 |
| D | Smooth | 0.2 | 1,000 | 0.02 | |
| E | Embossed | 0.5 | 2,400 | 0.02 | 3,000 |
| F | Smooth | 0.5 | 1,500 | 0.02 | |
| G | Embossed | 2.0 | 2,500 | 0.02 | 3,500 |
| H | Smooth | 2.0 | 1,800 | 0.02 | |
| I | Embossed | 3.0 | 2,600 | 0.02 | 2,500 |
| J | Smooth | 3.0 | 1,700 | 0.02 | |
| K | Embossed | 7.0 | 2,600 | 0.05 | 1,500 |
| L | Smooth | 7.0 | 1,600 | 0.05 | |
| M | Embossed | 10.0 | 2,500 | 0.10 | 500 |
| N | Smooth | 10.0 | 1,800 | 0.10 | |

EXAMPLE 1

Isotactic polypropylene sheet (Intrinsic viscosity 2.4 in tetralin at 135° C) was uni-axially stretched 5.0x in the longitudinal direction at 135° C. Onto this sheet was laminated molten propylene-ethylene copolymer (intrinsic viscosity 1.6, ethylene units 1.9 wt percent) by metal extrusion. Then, the double-layered sheet was stretched 8.0x in the transverse direction at 150° C and heat-set at 150° C for 10 seconds. Successively, the surface of the propylene-ethylene copolymer layer was roughened by embossing with a matted surface roll of about 80 mesh at 130° C and 1.0 kg/cm pressure.

The film (A) thus obtained consisted of a laminate having a 15μ of polypropylene layer and a 3μ of propylene-ethylene layer with a matted surface. Capacitors were prepared in the same manner as in the above comparative examples by using the dielectric spacer of film (A).

For comparison, other capacitors were prepared in the same manner by using a dielectric spacer, 18μ thick, of a conventional single layered bi-axially oriented polypropylene film with embossed surface (B).

These electrical capacitors had the following characteristics shown in Table 2.

TABLE 2

| Dielectric spacer | Corona starting voltage (V) | Breakdown life (hr) | Dissipation factor (%) |
|---|---|---|---|
| (A) | 2500 | 3000 | 0.02 |
| (B) | 800 | 1500 | 0.02 |

EXAMPLE 2

A double-layered laminated sheet was obtained by a co-extrusion method from isotactic polypropylene (intrinsic viscosity 2.4 in tetralin at 135° C) and propylene-ethylene copolymer containing 2.4 wt percent of ethylene units (intrinsic viscosity 2.4 in tetralin at 135° C). The sheet was stretched 5.0x in the longitudinal direction and 7.0x in the transverse direction. The resultant laminated bi-axially oriented film consisted of a 15μ polypropylene layer and a 3μ of propylene-ethylene copolymer layer.

The propylene-ethylene copolymer layer was embossed at 140° C and 3.0 kg/cm pressure by passing this film through a nip formed by a hot paper-covered roll at 150° C and a rubber roll. A paper-like pattern surface of 50 mesh was thus imparted to the copolymer layer.

Capacitors were prepared by the same method as in the comparative example, using as dielectric spacer the laminate (C) made as described in this example.

For comparison, other capacitors were prepared using dielectric spacers consisting of 18μ thick conventional bi-axially oriented polypropylene film without embossing (D).

These capacitors had the following characteristics as set forth in Table 3.

Corona starting voltage was measured as in the above Comparative Example, and corona extinction voltage was the voltage at which corona discharge stopped as the voltage was decreased, all at 60 Hz.

TABLE 3

| Dielectric spacer | Corona starting voltage (V) | Corona extinction voltage (V) |
|---|---|---|
| (C) | 2450 | 2300 |
| (D) | 1500 | 900 |

EXAMPLE 3

Capacitors were prepared in the same manner as in Example 2 except that the dielectric oil was mineral oil as authorized in JIS-2,320.

The results were as shown in Table 4.

TABLE 4

| Dielectric spacer | Corona starting voltage (V) | Corona extinction voltage (V) |
|---|---|---|
| Film (C) of Example 2 | 3000 | 1900 |
| Film (D) of Example 2 | 1800 | 500 |

What is claimed is:

1. An electrical capacitor consisting of a pair of conductive electrodes separated by a dielectric spacer comprising a bi-axially oriented polypropylene film having at least one surface laminated with a layer of propylene-ethylene copolymer including 0.5 – 7.0 wt percent ethylene units based on the total weight of the copolymer, said copolymer layer being embossed, and a dielectric oil impregnating the film.

2. The capacitor of claim 1 wherein the propylene-ethylene copolymer has an ethylene unit content of 0.5 – 3.0 wt percent based on the total weight of the copolymer.

3. The capacitor of claim 1 wherein the copolymer surface is embossed to a roughness of 3 – 500 mesh.

4. The capacitor of claim 1 wherein the copolymer surface is embossed to a roughness of 10 – 200 mesh.

* * * * *